US009480049B2

(12) United States Patent
Agiwal

(10) Patent No.: US 9,480,049 B2
(45) Date of Patent: Oct. 25, 2016

(54) METHOD AND SYSTEM FOR ASSIGNING ADDRESSES TO SUBSCRIBER STATIONS IN A WIRELESS COMMUNICATION ENVIRONMENT

(75) Inventor: Anil Agiwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 13/878,051

(22) PCT Filed: Oct. 6, 2011

(86) PCT No.: PCT/KR2011/007422
§ 371 (c)(1),
(2), (4) Date: Apr. 5, 2013

(87) PCT Pub. No.: WO2012/047048
PCT Pub. Date: Apr. 12, 2012

(65) Prior Publication Data
US 2013/0201977 A1    Aug. 8, 2013

(30) Foreign Application Priority Data

Oct. 6, 2010    (IN) .......................... 2970/CHE/2010

(51) Int. Cl.
*H04W 72/04*    (2009.01)
*H04W 8/26*    (2009.01)

(52) U.S. Cl.
CPC .............. *H04W 72/04* (2013.01); *H04W 8/26* (2013.01)

(58) Field of Classification Search
CPC ....... H04W 8/26; H04W 80/04; H04W 4/06; H04W 4/005; H04W 4/006; H04W 76/021; H04W 76/023; H04W 72/04; H04W 72/042; H04W 72/0446; H04L 29/12216; H04L 12/4645; H04L 29/12311
USPC ....... 370/338, 331, 312, 328, 252, 329, 389, 370/401, 352, 465, 310, 311, 395.2, 475, 370/208, 218, 254, 310.2, 315, 320, 322, 370/335, 336, 342, 351, 353, 356, 390, 392, 370/395.3, 395.4, 395.41, 395.53, 400, 410, 370/428, 431, 432, 466, 912; 455/422.1, 455/450, 406, 456.1, 466, 550.1, 3.01, 411, 455/414.1, 418, 419, 433, 434, 436, 437, 455/438, 445, 3.03, 404.1, 410, 412.1, 455/414.3, 415, 424, 428, 432.1, 432.3, 455/435.2, 446, 456.2, 456.3, 462, 464, 455/465, 509, 518, 519, 521, 554.1, 556.2, 455/561, 68; 709/228, 242
See application file for complete search history.

(56) References Cited

U.S. PATENT DOCUMENTS

2003/0043781 A1    3/2003    Proctor et al.
2007/0058653 A1    3/2007    Harris et al.
(Continued)

FOREIGN PATENT DOCUMENTS

WO    2010/017913 A1    2/2010

OTHER PUBLICATIONS

Wang; Comments on the Proposed Text from Large number of devices (DEV) Rapporteur Group in C802.16p-11/0001; IEEE C802.16p-11/0045; XP017614483; Mar. 14, 2011; Piscataway, NJ.
(Continued)

*Primary Examiner* — Charles C Jiang
*Assistant Examiner* — Rose Clark
(74) *Attorney, Agent, or Firm* — Jefferson IP Law, LLP

(57) ABSTRACT

A system and a method for assigning addresses to subscriber stations in a wireless communication environment are provided. The method includes receiving a request to register with a wireless communication network from a subscriber station, assigning a unicast address and at least one specific time duration to a subscriber station for communication with a network entity in the wireless communication network during registration process, and communicating the unicast address and the at least one specific time duration to the subscriber station, wherein the assigned unicast address is valid for the subscriber station during the at least one specific time duration.

27 Claims, 11 Drawing Sheets

(56) References Cited

U.S. PATENT DOCUMENTS

| | | |
|---|---|---|
| 2008/0043665 A1 | 2/2008 | Jeon et al. |
| 2010/0057485 A1* | 3/2010 | Luft .................................. 705/1 |
| 2011/0098020 A1* | 4/2011 | Van Loon et al. ............ 455/411 |
| 2011/0128911 A1* | 6/2011 | Shaheen ............... H04L 63/104 370/328 |
| 2011/0161503 A1* | 6/2011 | Krebs ..................... H04W 4/00 709/227 |
| 2011/0249636 A1* | 10/2011 | Cherian et al. ............... 370/329 |
| 2012/0004003 A1* | 1/2012 | Shaheen ............... H04W 4/005 455/509 |
| 2012/0057703 A1* | 3/2012 | Hsuan et al. .................. 380/268 |
| 2012/0213209 A1* | 8/2012 | Bergstrom et al. ........... 370/336 |
| 2012/0252445 A1* | 10/2012 | Lindholm et al. ............. 455/433 |

OTHER PUBLICATIONS

Tao et al.; Time-Sharing STID Addressing Scheme; IEEE C802.16p-11/0068; XP017712333; May 8, 2011; Piscataway, NJ.

\* cited by examiner

SINGLE ASSIGNMENT FOR A LEGACY
SS OR AN M2M SS WITHOUT ID1

SINGLE ASSIGNMENT FOR AN M2M SS WITH ID1

MULTIPLE ASSIGNMENT FOR AN M2M DEVICE WITH ID1

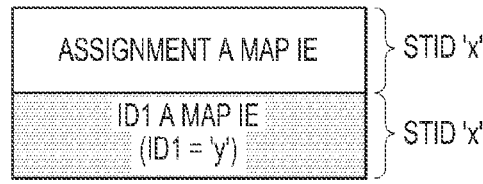
ASSIGNMENT MEANT FOR AN M2M SS WITH ID 'Y' IN A
M2M SSs GROUP WITH STID 'x'
FIG.10A
ASSIGNMENT MEANT FOR
ALL SSs IN A M2M
GROUP WITH STID 'x'
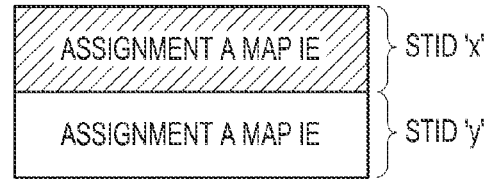
ASSIGNMENT MEANT FOR
ALL SSs IN A M2M
GROUP WITH STID 'x'
FIG.10B
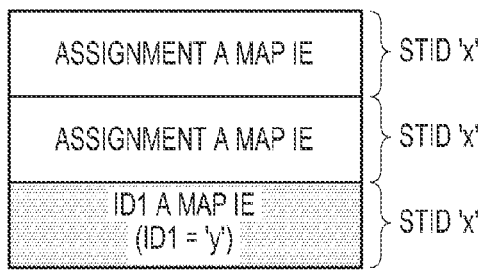
MULTIPLE ASSIGNMENT
FOLLOWED BY ID1 A MAP IE
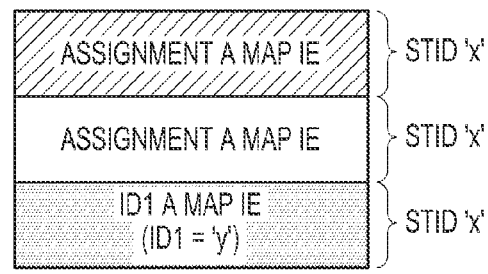
MULTIPLE ASSIGNMENT
FOLLOWED BY ID1 A MAP IE
FIG.10C        FIG.10D

METHOD AND SYSTEM FOR ASSIGNING ADDRESSES TO SUBSCRIBER STATIONS IN A WIRELESS COMMUNICATION ENVIRONMENT

PRIORITY

This application is a National Stage application under 35 U.S.C. §371 of an International application filed on Oct. 6, 2011 and assigned application No. PCT/KR2011/007422, and claims the benefit under 35 U.S.C. §365(b) of an Indian patent application filed on Oct. 6, 2010 in the Indian Intellectual Property Office and assigned Serial No. 2970/CHE/2010, the entire disclosure of which is hereby incorporated by reference.

BACKGROUND OF THE INVENTION

1. Field of the Invention

The present invention relates to the field of wireless communication. More particularly, the present invention relates to the field of assigning addresses to subscriber stations in a wireless communication environment.

2. Description of the Related Art

A wireless communication network includes one or more base stations deployed over a geographical region to provide wireless connectivity to subscriber stations within a coverage area of respective base stations. Basically, each base station in the wireless communication network is configured to provide various types of services (e.g., voice, data, multimedia services, and the like) to subscriber stations (also known as subscriber stations) that are operating within the geographical area served by the wireless communication network.

Typically, a base station assigns a unicast address from a unique address space to each subscriber station when the subscriber station in its coverage area registers with a wireless area network. The unicast address is unique across subscriber stations registered with the same base station. For example in the Institute of Electrical and Electronics Engineers (IEEE) 802.16m based standard, a base station assigns a 12 bit Station Identifier (STID) to each subscriber station registered with the base station.

Basically, the base station assigns the unicast address to enable each subscriber station to communicate with the base station. For example, the subscriber station scrambles physical bursts using the assigned unicast address and transmits the scrambled physical burst in uplink. Also, the base station uses the unicast address to send a dedicated downlink control channel (e.g., control channel carrying resource allocation message in downlink). It can be noted that, the base station removes the assigned unicast address when the respective subscriber station deregisters with the wireless communication network.

Currently, an IEEE 802.16m based system allows a base station to register up to 4096 subscriber stations with the wireless communication network. In recent times, the IEEE 802.16m based system is configured to support machine-to-machine communication devices for applications such as smart grid, vehicular tracking, healthcare, and the like. Sometimes, this requires a base station to register more than 4096 subscriber stations at a time due to large number of machine to machine communication devices existing within coverage area of the base station. However, the base station may not be able to register more than 4096 subscriber stations due to limitation in number of unicast addresses (e.g., 12 bit STID) available for assignment.

Therefore, a need exists for a method and system for assigning addresses to subscriber stations in a wireless communication environment.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and system for assigning addresses to subscriber stations in a wireless communication environment.

In accordance with an aspect of the present invention, a method for assigning addresses to subscriber stations in a wireless communication environment is provided. The method includes assigning a unicast address and at least one specific time duration to a subscriber station for communication with a network entity in a wireless communication network, and communicating the unicast address and the at least one specific time duration to the subscriber station, wherein the assigned unicast address is valid for the subscriber station during the assigned at least one specific time duration.

In accordance with another aspect of the present invention, an apparatus is provided. The apparatus includes a processor, and a memory coupled to the processor, wherein the memory comprises an address assignment module configured for assigning a unicast address and at least one specific time duration to a subscriber station for communication with a wireless communication network, and communicating the unicast address and the at least one specific time duration to the subscriber station, wherein the assigned unicast address is valid for the subscriber station during the assigned at least one specific time duration.

In accordance with another aspect of the present invention, a system is provided. The system includes a plurality of subscriber stations, and a base station comprising an address assignment module configured for assigning a unicast address and at least one specific time duration to one of the subscriber stations for communicating with the base station, and communicating the unicast address and the at least one specific time duration to the one of the subscriber stations, wherein the assigned unicast address is valid for the one of the subscriber stations during the at least one specific time duration.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF DRAWINGS

FIGS. 10A-10D are schematic representations illustrating unicast/multicast resource assignment signaling in a group, according to an exemplary embodiment of present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
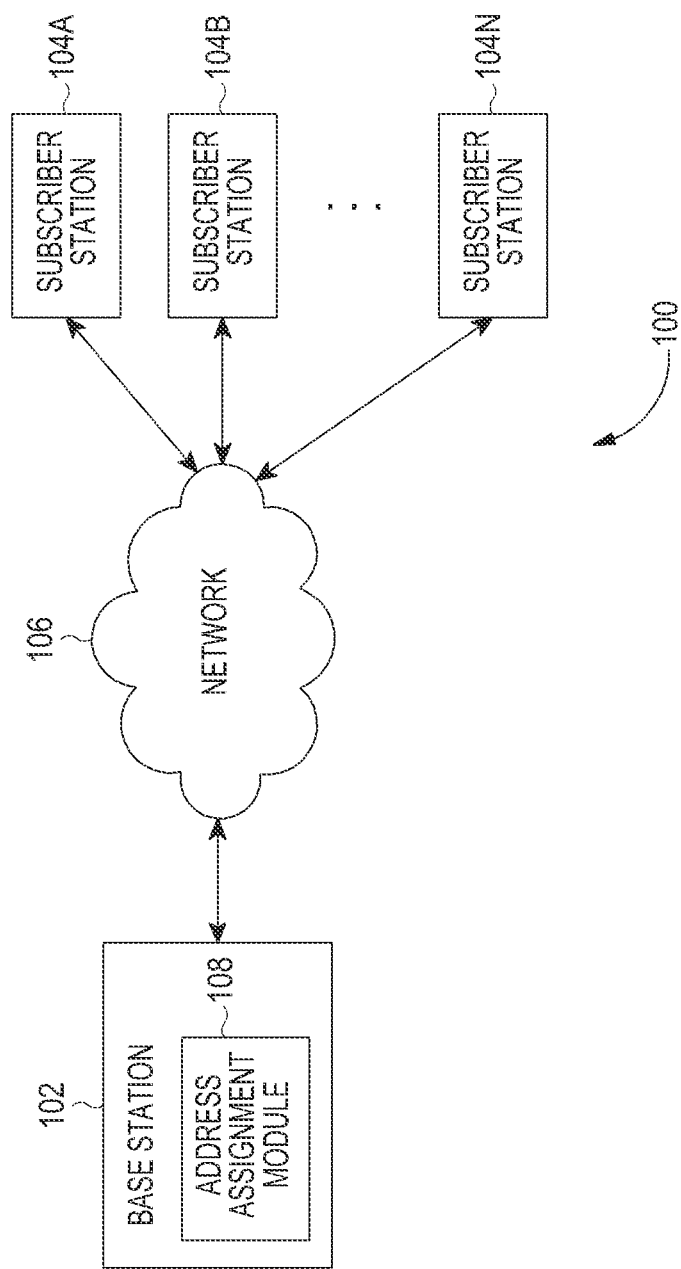
FIG. 1 illustrates a block diagram of a wireless communication system for assigning addresses to subscriber stations, according to an exemplary embodiment of present invention.

FIG. 1 illustrates a block diagram of a wireless communication system 100 for assigning addresses to subscriber stations, according to an exemplary embodiment of present invention.

Referring to FIG. 1, the system 100 includes a base station 102 and subscriber station 104A-N connected to the base station 102 via a wireless network 106. The subscriber stations 104A-N may include legacy subscriber stations and/or non-legacy subscriber stations (e.g., Machine-To-Machine (M2M) communication devices). The base station 102 includes an address assignment module 108 for assigning addresses to the subscriber stations 104A-N.

Consider that the subscriber station 104A wishes to register with the wireless communication network 106. In such a case, the base station 102 receives a request to register with the wireless communication network 106 from the subscriber station 104A. The address assignment module 108 determines whether the subscriber station 104A associated with the registration request is a legacy subscriber station or a new subscriber station. If the subscriber station 104A is a legacy subscriber station, then the address assignment module 108 assigns a unique unicast address from an address space to the legacy subscriber station 104A. The address assignment module 108 communicates the assigned unicast address to the legacy subscriber station 104.

If the subscriber station 104A is a non-legacy subscriber station, then the address assignment module 108 assigns a unicast address with specific time durations to the subscriber station 104A. This means that the subscriber station 104A can use the assigned unicast address only in the assigned time durations and the base station 102 can use the assigned unicast address to identify the subscriber station 104A only in the assigned time durations. It can be noted that, the address assignment module 108 can assign the same unicast address to multiple non-legacy subscriber stations with different time durations. In this manner, the base station 102 can uniquely identify the different subscriber stations assigned the same unicast address based on the specific time duration assigned to each of the subscriber stations.

According to an exemplary embodiment of the present invention, the address assignment module 108 assigns time durations together with unicast address to the non-legacy subscriber station 104A. According to another exemplary embodiment of the present invention, the address assignment module 108 assigns time durations together with unicast address to non-legacy subscriber station 104A only if the unicast address is shared with other subscriber station. Accordingly, the address assignment module 108 communicates the unicast address and the specific timer duration to the subscriber station 104A.

Figure 2:
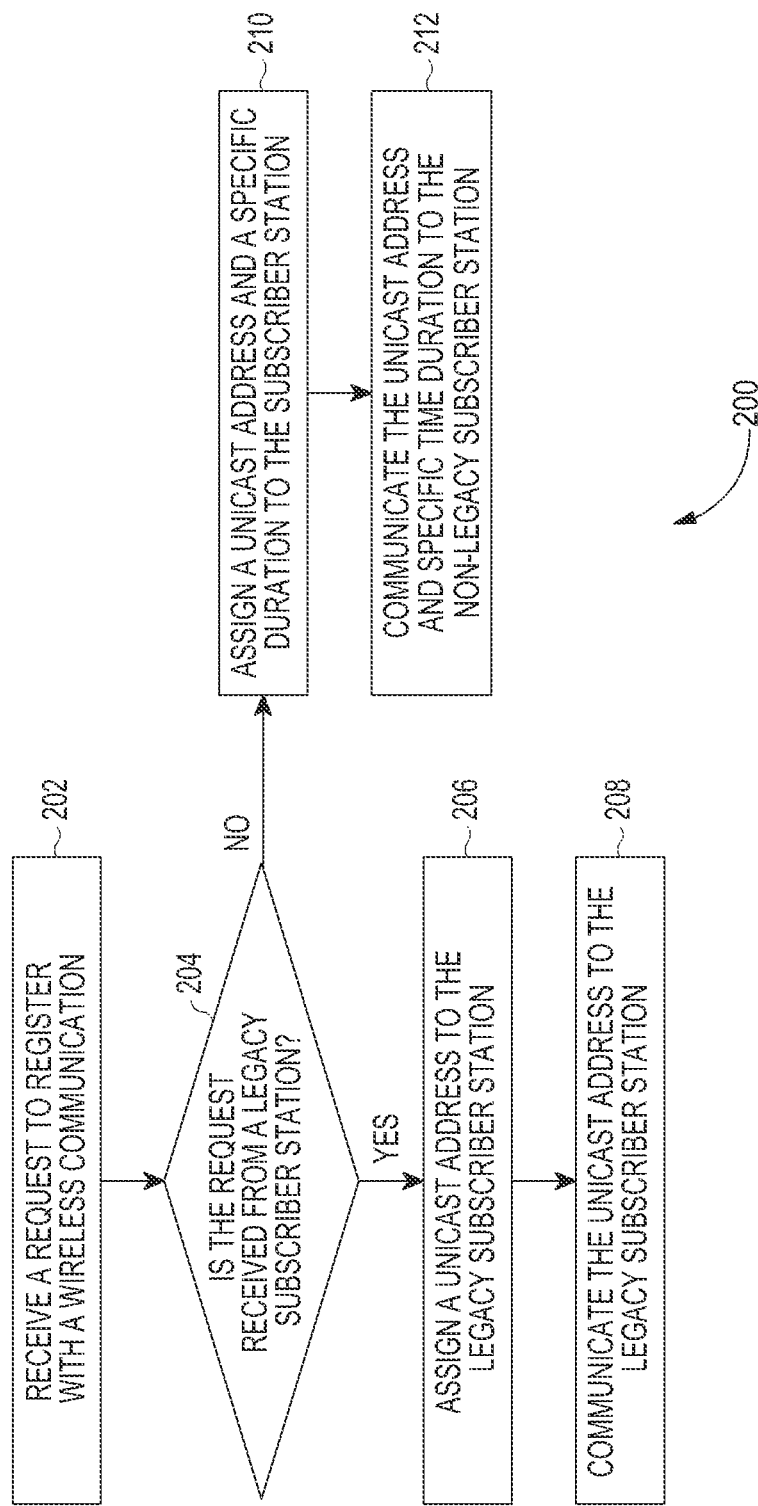
FIG. 2 is a process flowchart of a method of assigning addresses to subscriber stations, according to an exemplary embodiment of present invention.

FIG. 2 is a process flowchart 200 of a method of assigning addresses to subscriber stations, according to an exemplary embodiment of present invention.

Referring to FIG. 2, at step 202, a request to register with the wireless communication network 106 is received from the subscriber station 104A. For example, the base station 102 may receive the request to register the subscriber station 104A with the wireless communication network 106. At step 204, it is determined whether the subscriber station 104A associated with the request is a legacy subscriber station. For example, the base station 102 may determine whether the subscriber station 104A associated with the request corresponds to a legacy subscriber station. If the subscriber station 104A is a legacy subscriber station, then at step 206, a unique unicast address from an address space is assigned to the legacy subscriber station 104A. For example, if the base station 102 determines that the subscriber station 104A corresponds to a legacy subscriber station, then the base station 102 may assign a unique unicast address to the legacy subscriber station 104A. At step 208, the assigned unicast address is communicated to the legacy subscriber station 104A. For example, the base station 102 may communicate the assigned unicast address to the legacy subscriber station 104A.

If the subscriber station 104A is a non-legacy subscriber station, then at step 210, a unicast address with specific time duration is assigned to the subscriber station 104A. For example, if the base station 102 determines that the subscriber station 104A corresponds to a non-legacy subscriber station, then the base station 102 may assign a unicast address with specific time duration to the subscriber station. At step 212, the unicast address and the specific timer duration is communicated to the subscriber station 104A. For example, the base station 102 may communicate the unicast address and corresponding specific timer duration to the subscriber station 104A.

Figure 3:
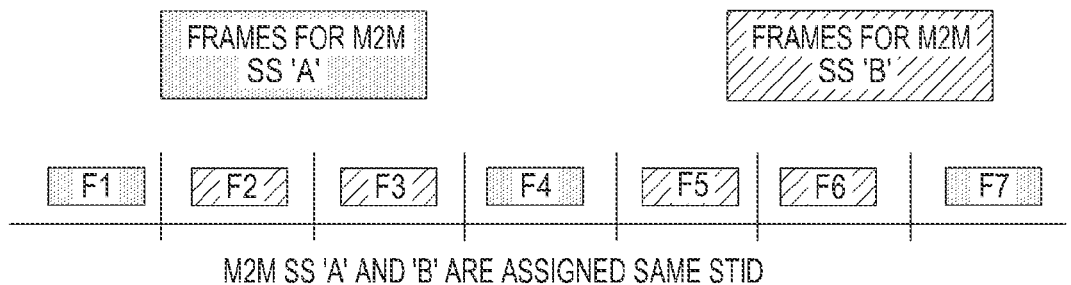
FIG. 3 is a schematic diagram illustrating assignment of a unicast address and different time durations to distinguish between multiple subscriber stations, according to an exemplary embodiment of present invention.

FIG. 3 is a schematic diagram 300 illustrating assignment of a unicast address and different time durations to distinguish between multiple subscriber stations, according to an exemplary embodiment of present invention.

Referring to FIG. 3, the assigned time durations are units of frames. In an exemplary implementation, each of the non-legacy subscriber stations 104A-N sends a request to register with the base station 102. In such a case, the address assignment module 108 assigns the same unicast address but different frames for communicating with the base station 102. For example, the subscriber station 104A is assigned frames F1, F4, F7 and so on while the subscriber station 104B is assigned frames F2, F3, F5, F6, and so on for communicating with the base station 102. Because the subscriber stations 104A and 104B communicate with the base station 102 in different frames known to both the base station 102 and subscriber stations 104A-B, the address assignment module 108 can assign same unicast address to subscriber stations 104A-B.

Figure 4:
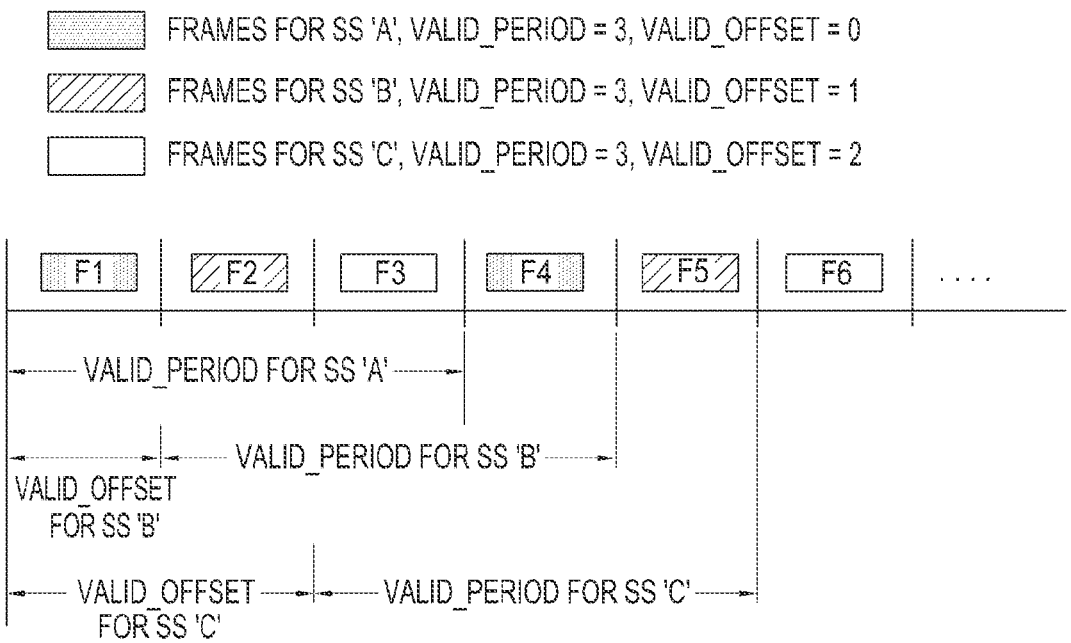
FIG. 4 is a schematic diagram illustrating assignment of a unicast address and different time durations to distinguish between multiple subscriber stations, according to an exemplary embodiment of present invention.

FIG. 4 is a schematic diagram 400 illustrating assignment of a unicast address and different time durations to distinguish between multiple subscriber stations, according to an exemplary embodiment of present invention.

Referring to FIG. 4, the assigned time durations are communicated to the subscriber stations 104A-C in terms of valid period and valid offset. It can be noted that the time duration (e.g., frames in which the assigned unicast address can be used by the subscriber stations 104A, 104B and 104C) are the frames which satisfy the following Equation 1:

$$\text{Framenumber mod Valid\_Period} = \text{Valid\_Offset,} \qquad \text{Equation 1}$$

In Equation 1, Framenumber corresponds to a frame sequence number.

As illustrated in FIG. 4, the subscriber stations 104A-C are assigned the same unicast address and the same valid period, but different values of valid offset (e.g., 0, 1, and 2). This ensures that the subscriber stations 104A-C have different time durations assigned. The assignment of same valid period amongst the subscriber stations sharing the same unicast address reduces the signaling overhead when the subscriber station or the wireless communication network has to send a signaling message carrying the subscriber station identity as the fields of the signaling message. The subscriber station or the wireless communication network may send the unicast address and valid_offset as the fields of signaling message. But this limits the number of subscriber stations which can share the same unicast address.

Figure 5:
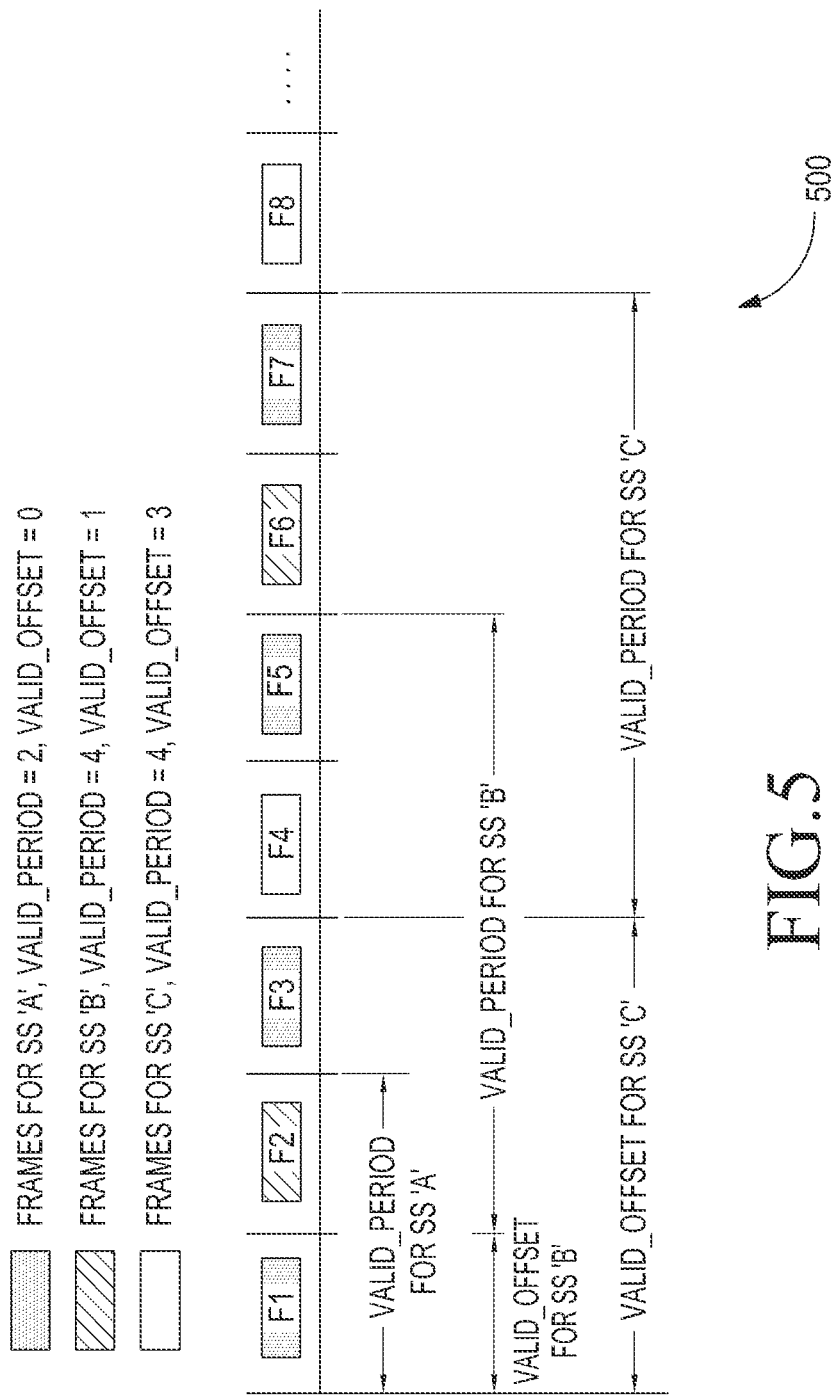
FIG. 5 is a schematic diagram illustrating assignment of a unicast address and different time durations to distinguish between multiple subscriber stations, according to an exemplary embodiment of present invention.

FIG. 5 is a schematic diagram 500 illustrating assignment of a unicast address and different time durations to distinguish between multiple subscriber stations, according to an exemplary embodiment of present invention.

Referring to FIG. 5, the subscriber stations 104A-C are assigned the same unicast address but different values of valid period and valid offset. The subscriber stations 104A through 104C are assigned valid periods 2, 4, and 4 respectively. The subscriber stations 104A through 104C are assigned valid offset 0, 1, and 3 respectively. This ensures that the subscriber stations 104A-C are assigned different time durations. The subscriber station or the wireless communication network should send the unicast address, valid period and valid offset in the fields of signaling message when the subscriber station or the wireless communication network should send a signaling message carrying the subscriber station identity as the fields of the signaling message. However, this enables sharing of same unicast address with more number of subscriber stations.

In order to assign multiple consecutive frames to the subscriber stations 104A-N, multiple consecutive valid offset values may be assigned to the subscriber stations 104A-N sharing the same unicast address as illustrated in FIGS. 4 and 5. However, an alternate parameter 'NumFRAMES' may be assigned to the subscriber stations 104A-N in addition to Valid period and Valid Offset. 'NumFRAMES' indicates the number of consecutive frames starting from Framenumber which satisfies the following Equation 2:

$$\text{Framenumber\_mod\_Valid\_Period} = \text{Valid\_Offset} \qquad \text{Equation 2}$$

Figure 6:
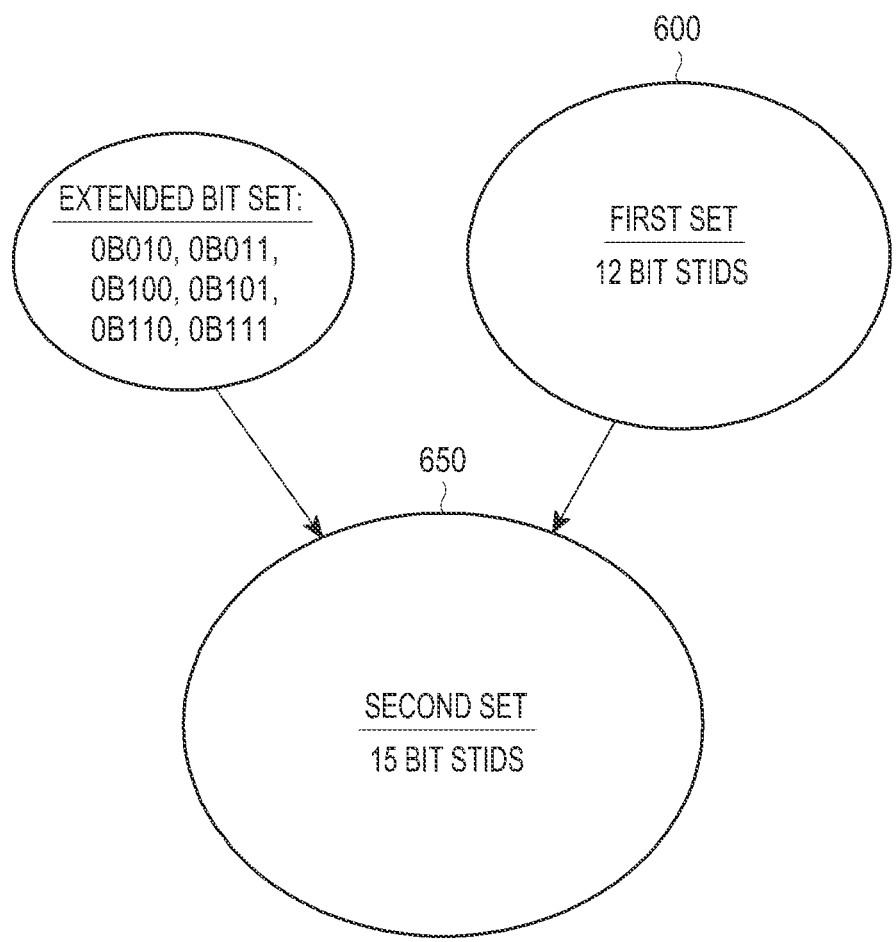
FIG. 6 illustrates schematic representation of unicast address space used for assigning unicast addresses to subscriber stations by an address assignment module, according to an exemplary embodiment of present invention.

FIG. 6 illustrates a schematic representation of unicast address spaces used for assigning unicast addresses to subscriber stations by an address assignment module, according to an exemplary embodiment of present invention.

Referring to FIG. 6, an address assignment module 108 assigns a unicast address to the subscriber stations 104A-N from a first set of station identifiers 600 and a second set of station identifiers 650. The first set of Station Identifiers (STIDs) 600 includes 4096 number of 12 bit STIDs and the second set of STIDs includes 15 bit STIDs 650. The 15 bit STIDs are derived by combining the 12 bit STIDs with a set of extended bits to address a large number of subscriber stations 104A-N. The set of extended bits includes elements {0b010, 0b011, 0b100, 0b101, 0b110 and 0b111}.

Each 12 bit STID from the first set 600 is appended with an element from the set of extended bits to an element of the second set 650. For example, the element 0b010 from the set of extended bits is appended to 12 bit STID 0b000000000001 to generate a new 15 bit STID 0b010000000000001 as shown in FIG. 6. Hence, it is possible to generate six new STIDs from each 12 bit STID, except STID 0b111111111111 from which five new STIDs can be generated. For example, the element 0b010 from the set of extended bits is not added to the 12 bit STID having value 0b111111111111. As a result, a second set of STIDs 650 consisting of 4096*6−1=24575 number of 15 bit STIDs can be generated. It can be noted that, if some of 12 bit STIDs are reserved for certain use, then those STIDs are not used to generate new STIDs.

As described in FIG. 2, if the subscriber station 104A corresponds to a legacy subscriber station, then the address assignment module 108 assigns the unicast address from 12 bit STIDs as a legacy subscriber station can understand STIDs from the first set 600. If the subscriber station 104A corresponds to a non-legacy subscriber station, then the address assignment module 108 assigns the unicast address selected from the 12 bit STIDs or the 15 bit STIDs. The address assignment module 108 may indicate assignment of the 12 bit STID or 15 bit STID using a one bit indicator in signaling messages. For example, 15 bit can be used to signal the assigned STID in the signaling message even if 12 bit STID is assigned. In case of 12 bit STID is assigned, then three MSBs are set to zero indicating that the unicast address is a 12 bit STID.

Figure 7A:
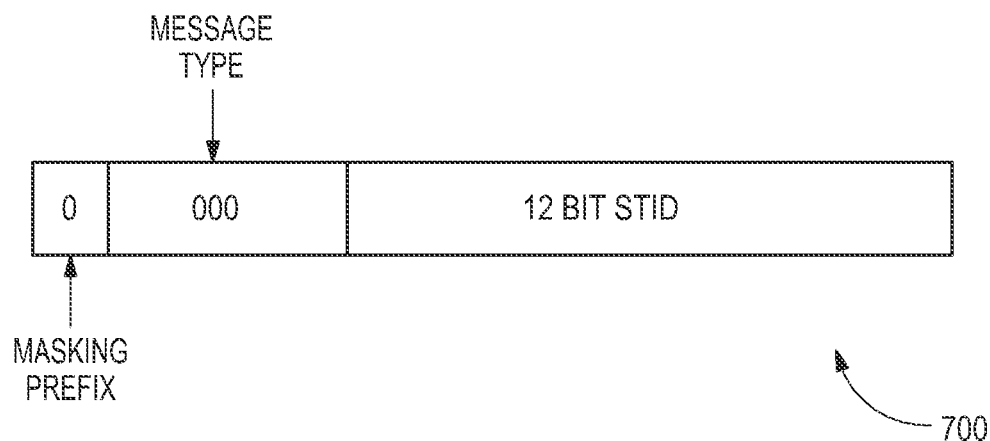
FIGS. 7A and 7B are schematic representations illustrating Cyclic Redundancy Check (CRC) masking formats for encoding 12 bit Station Identifier (STID) and 15 bit STID in a CRC mask, according to an exemplary embodiment of present invention.
Figure 7B:
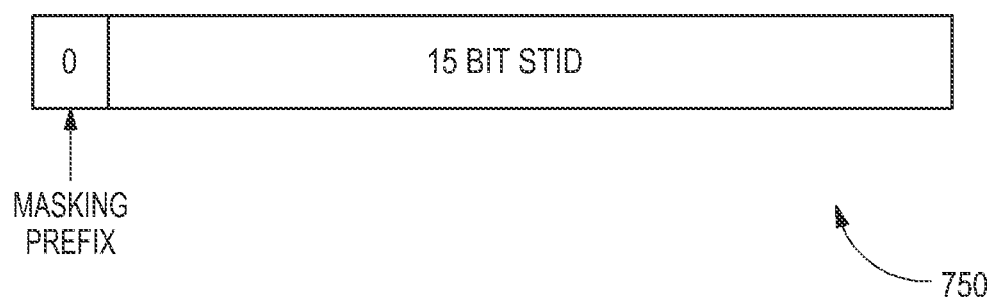

FIGS. 7A and 7B are schematic representations illustrating Cyclic Redundancy Check (CRC) masking formats for encoding 12 bit STID and 15 bit STID in a CRC mask, according to an exemplary embodiment of present invention.

Referring to FIGS. 7A and 7B, the STID assigned to the subscriber station 104A is encoded in a 16 bit CRC mask in a resource assignment signaling message.

As illustrated in FIG. 7A, the 16 bit CRC mask 700 encoding the 12 bit STID includes a 1 bit masking prefix, a 3 bit message type indicator, and a 12 bit STID.

As illustrated in FIG. 7B, when the STID assigned to the subscriber station 104A is a 15 bit STID, the 16 bit CRC mask 750 includes a 1 bit masking prefix and a 15 bit STID.

Figure 8A:
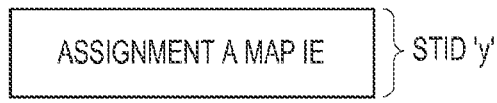
FIGS. 8A through 8C are schematic representations of resource assignment signaling, according to an embodiment of present invention.
Figure 8B:
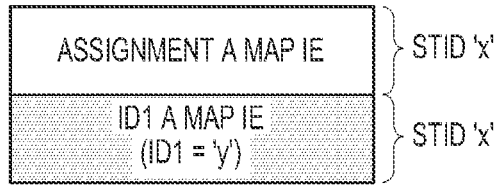
Figure 8C:
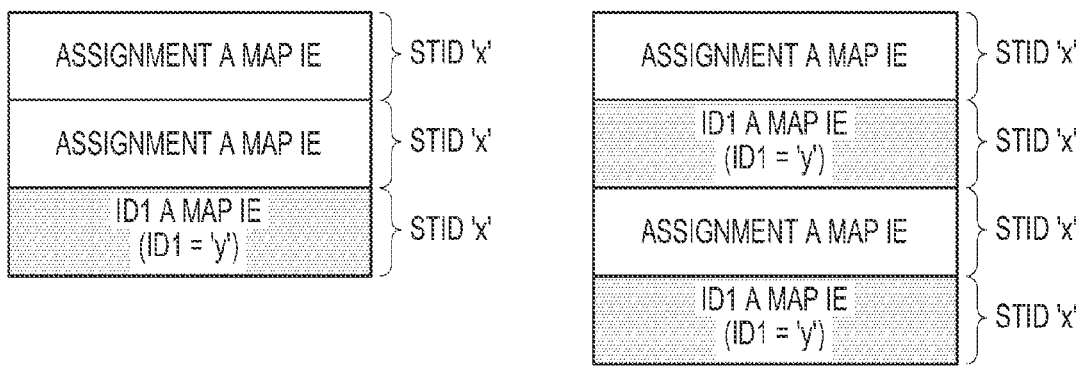

FIGS. 8A through 8C are schematic representations of resource assignment signaling, according to an exemplary embodiment of present invention.

Referring to FIGS. 8A through 8C, according to an exemplary embodiment of the present invention, a new address ID1 is defined in addition to STID for assigning unicast address to large number of subscriber stations 104A-N. Therefore, the address assignment module 108 is configured for assigning a unicast address from a set of STIDs including 12 bit STIDs and 15 bit STIDs, and a set of ID1s including ID1s having values from 0 to $2^{n-1}$, where 'n' corresponds to the size of ID1. The size of ID1 is determined depending on the number of subscriber stations 104A-N to be addressed. In order to support large number of subscriber stations, a 12 or 15 bit STID is shared amongst multiple subscriber stations 104A-N. The ID1 is uniquely assigned amongst the subscriber stations 104A-N sharing the same STID. It can be noted that, the legacy subscriber stations are assigned STID from 12 bit STIDs. For the non-legacy subscriber stations 104A-N are assigned an STID from 12 or 15 bit STIDs and an ID from the set of ID1s.

During resource assignment, the STID is encoded in the resource assignment signaling and the ID1 is assigned to the subscriber station in addition to the STID is encoded using one of the following ways. The ID1 is carried in a new assignment A-MAP IE, ID1 A-MAP IE. A-MAP IE type 0b1101 or 0b1110 can be used to define ID1 A-MAP IE. The assignment A-MAP IE is followed by ID1 A-MAP IE, if the assignment A-MAP IE is for a subscriber station which has been assigned an STID and ID1. Both ID1 A-MAP IE and the assignment A-MAP IE carry the STID of the subscriber station 104A and the ID1 for that subscriber station 104A is present in the ID1 A-MAP IE. If there are multiple consecutive assignment A-MAP IEs for the subscriber station 104A, the entire group of multiple consecutive assignment A-MAP IEs is followed by only one ID1 A-MAP IE. Alternatively, each assignment A-MAP IE for the subscriber station 104A which has been assigned the STID and the ID1 is followed by ID1 A-MAP IE.

The assignment A MAP IE for legacy subscriber station 104B is not followed by ID1 A-MAP IE as shown in FIG. 8A. The assignment A MAP IE for the M2M subscriber station 104A, which has been assigned an STID and ID1, is followed by ID1 A MAP IE and both the assignment A MAP IE and the ID1 A MAP IE carries its STID, as shown in FIG. 8B. The multiple assignment A MAP IEs for M2M subscriber station 104A, which has been assigned an STID and ID1, are followed by ID1 A MAP IE and assignment A MAP IEs and ID1 A MAP IE carries its STID, as shown in FIG. 8C. The assignment A MAP IE for the M2M subscriber station 104A which has been assigned only STID is not followed by ID1 A MAP IE as shown in FIG. 8A.

It can be noted that, the STID assigned to the legacy subscriber station 104B cannot be shared with any other subscriber station. Alternatively, the STID assigned to the legacy subscriber station 104B can be shared with the new subscriber station by generating a CRC mask as follows for new SS: 1 bit masking prefix set to '0', 3 bit message type indicator set to any value other than one used in legacy system (i.e. 000, 010, 001) followed by STID. As CRC mask generation is different for non-legacy subscriber station 104A and the legacy subscriber station 104B, both can be assigned the same STID.

The STID assigned to non-legacy subscriber station 104A can be shared with other non-legacy subscriber stations (e.g., two new subscriber stations can have the same STID but have different ID1s). One non-legacy subscriber station can be assigned STID only and another non-legacy subscriber station can be assigned the same STID. However, the non-legacy subscriber station will be assigned an ID1. Two or more new subscriber station without ID1 but same STID is not allowed.

In a case in which the multiple consecutive assignment A-MAP IEs for the same subscriber station in A-MAP are followed by only one ID1 A-MAP IE, the subscriber station 104A processes the multiple consecutive A-MAP IEs followed by an ID1 A-MAP IE (assignment A-MAP IEs and ID1 A-MAP IE are encoded with same STID) belonging to same subscriber station. However, in a case in which the assignment A-MAP IE for the subscriber station with STID and ID1 is always followed by ID1 A-MAP IE, if the multiple assignment A-MAP IEs are followed by ID1 A-MAP IE (assignment A-MAP IEs and ID1 A-MAP IE are encoded with same STID) only the last assignment A-MAP IE corresponds to an assignment for the subscriber station with STID and ID1, with the remaining corresponding to the subscriber station with STID and not having a corresponding ID1 assigned thereto.

Figure 9:
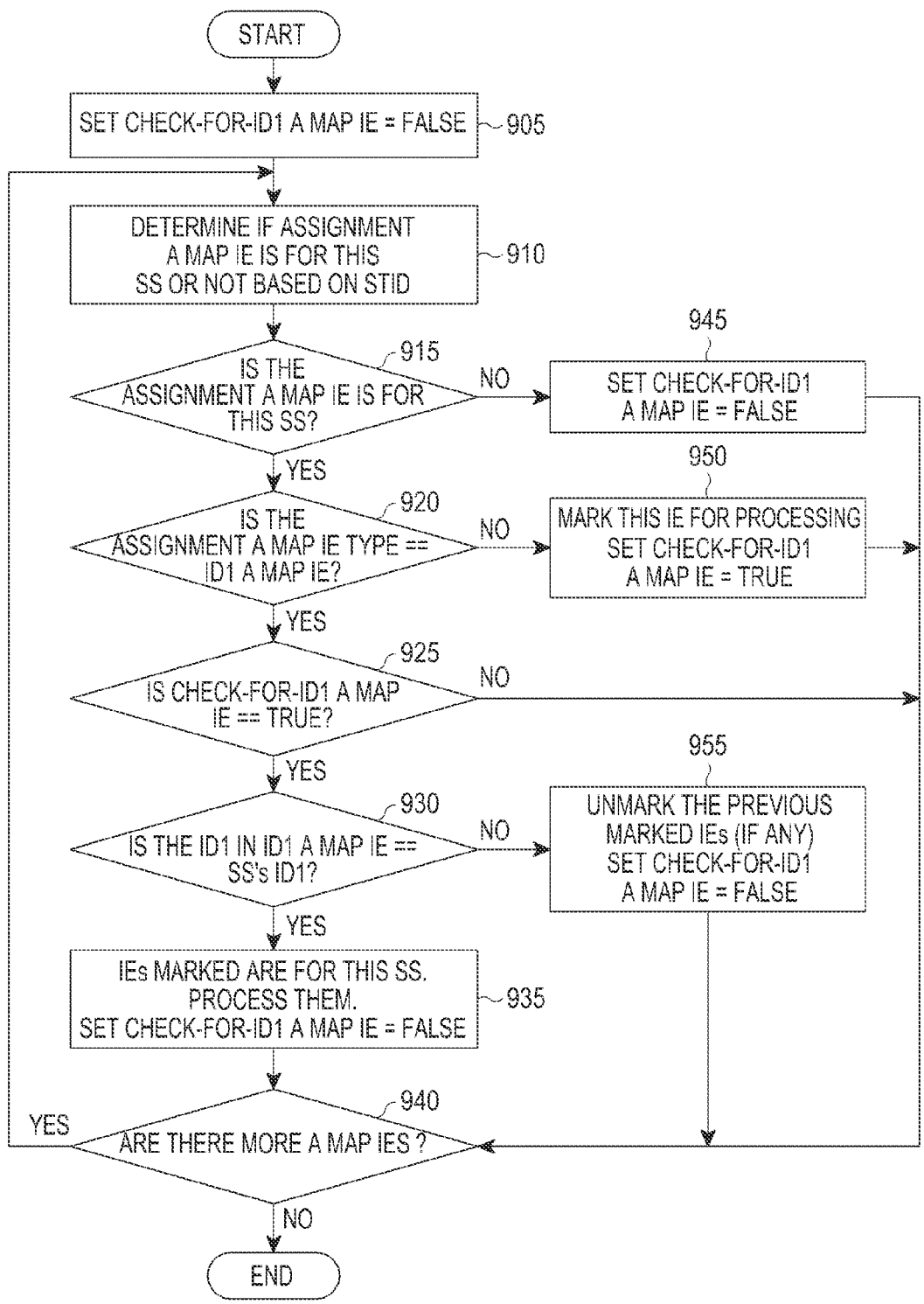
FIG. 9 is a process flowchart illustrating an exemplary method of decoding resource assignments by a non-legacy subscriber station which has been assigned STID and address ID1, according to an exemplary embodiment of present invention.

FIG. 9 is a process flowchart illustrating an exemplary method of decoding resource assignments by a non-legacy subscriber station which has been assigned STID and address ID1, according to an exemplary embodiment of present invention.

Referring to FIG. 9, for decoding the resource assignment, it is assumed that for multiple consecutive assignment A-MAP IEs for the same subscriber station in A-MAP, the entire group of multiple consecutive assignment A-MAP IEs is followed by only one ID1 A-MAP IE.

It is appreciated that, decoding of resource assignments by the non-legacy subscriber station which has been assigned STID only where other non-legacy subscriber stations cannot be assigned the same STID is same as that performed by the legacy subscriber stations.

At step 905, a Check-for-ID1 A MAP IE is set to false.

Thereafter, at steps 910 and 915, the subscriber station analyzes the STID corresponding to the A MAP IE and determines whether an assignment of the A MAP IE corresponds to an assignment thereto based on the STID.

If the subscriber station determines that the assignment A MAP IE does not correspond to an assignment thereto based on the STID at step 915, the subscriber station proceeds to step 945 at which the Check-for-ID1 A MAP IE is set to false. Thereafter, the subscriber station proceeds to step 940 at which the subscriber station determines whether there are more A MAP IEs. If the subscriber station determines that there are more A MAP IEs at step 940, then the subscriber station proceeds to step 910. Otherwise, the subscriber station ends the process.

In contrast, if the subscriber station determines that the assignment A MAP IE corresponds to an assignment thereto based on the STID at step 915, the subscriber station determines whether the assignment A MAP IE type corresponds to an ID1 A MAP IE at step 920.

If the subscriber station determines that the assignment A MAP IE type does not correspond to an ID1 A MAP IE at step 920, then the subscriber station proceeds to step 950 at which the subscriber station marks the IE for processing and the Check-forID1 A MAP IE is set to true. Thereafter, the subscriber station proceeds to step 940.

In contrast, if the subscriber station determines that the assignment A MAP IE type corresponds to an ID1 A MAP IE at step 920, then the subscriber station proceeds to step 925 at which the subscriber station determines whether the Check-for-ID1 A MAP IE is set to true.

If the subscriber station determines that the Check-for-ID1 A MAP IE is not set to true at step 925, then the subscriber station proceeds to step 940.

In contrast, if the subscriber station determines that the Check-for-ID1 A MAP IE is set to true at step 925, then the subscriber station proceeds to step 930 at which the subscriber station determines whether the ID1 in the ID1 A MAP IE corresponds to the ID1 associated with the subscriber station.

If the subscriber station determines that the ID1 in the ID1 A MAP IE is not associated with the subscriber station at step 930, then the subscriber station proceeds to step 955 at which the subscriber station unmarks the previous marked IE (if any) and sets the Check-for-ID1 A MAP IE to false. Thereafter, the subscriber station proceeds to step 940.

In contrast, if the subscriber station determines that the ID1 in the ID1 A MAP IE corresponds to the ID1 associated with the subscriber station at step 930, then the subscriber station proceeds to step 935 at which the IEs are marked as being associated with the subscriber station and the IEs are processes. The subscriber station further sets the Check-for-ID1 A MAP IE to false. Thereafter, the subscriber station proceeds to step 940.

FIGS. 10A through 10D are schematic representations illustrating unicast/multicast resource assignment signaling in a group, according to an exemplary embodiment of present invention.

Referring to FIGS. 10A-10D, an STID and ID1 can be used to form a group of subscriber stations, where each member of the group is assigned the same STID but different ID1s. The resource assignment signaling to indicate whether the burst is for the whole group or for a specific member of the group is as follows.

If the assignment A-MAP IE is followed by an ID1 A-MAP IE and both assignment A-MAP IE and ID1 A-MAP IE are encoded with same STID, then resource or the burst is for a subscriber station which has been assigned that STID and ID1 carried in ID1 A-MAP IE as illustrated in FIG. 10A.

If the assignment A-MAP IE is not followed by an ID1 A-MAP IE or another assignment A-MAP IE encoded with same STID, then resource or the burst is for a subscriber station which has been assigned that STID, as illustrated in FIG. 10B.

If the multiple assignment A-MAP IEs encoded with same STID are not followed by an ID1 A-MAP IE encoded with same STID, then resources or the bursts are for all SSs which has been assigned that STID, as illustrated in FIG. 10B.

If the multiple assignment A-MAP IEs are followed by an ID1 A-MAP IE and both assignment A-MAP IEs and ID1 A-MAP IEs are encoded with same STID, then resources or the bursts are for a subscriber station which has been assigned the STID and ID1 carried in the ID1 A-MAP IE, as illustrated in FIG. 10C.

If the multiple assignment A-MAP IEs are followed by an ID1 A-MAP IE and the assignment A-MAP IEs and ID1 A-MAP IEs are encoded with same STID, then all resources except the last one is for all subscriber stations which have been assigned that STID. The last resource is for subscriber station which has been assigned that STID and ID1 carried in ID1 A-MAP IE. For unicast signaling for a subscriber station with STID and ID1, each assignment A-MAP IE is followed by the ID1 MAP IE, as illustrated in FIG. 10D.

Figure 11:
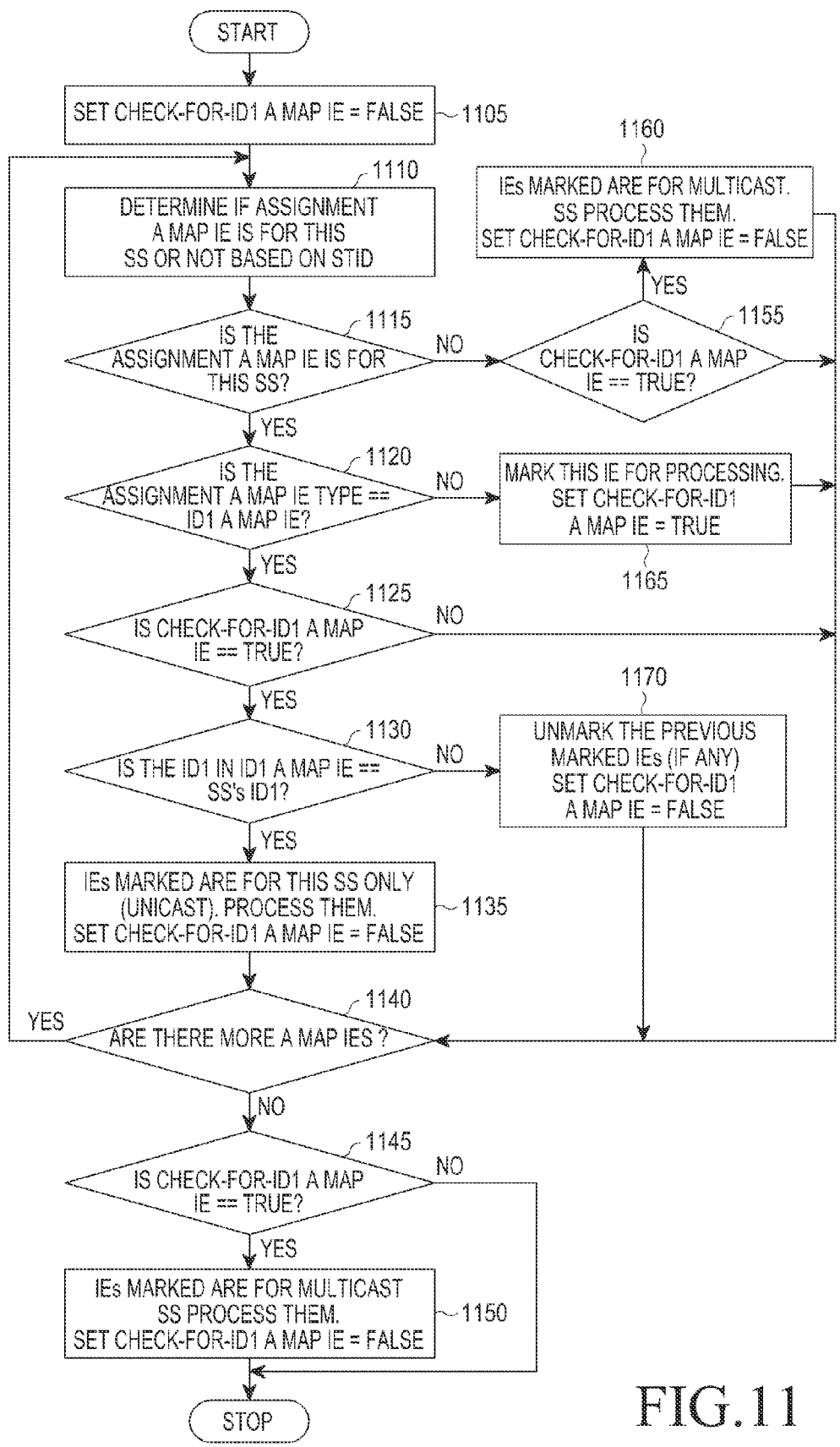
FIG. 11 is a process flowchart illustrating a method of identifying resource assignments by a subscriber station belonging to a multicast group, where each member of the group is assigned the same STID but different ID1s, according to an exemplary embodiment.

FIG. 11 is a process flowchart illustrating a method of identifying resource assignments by a subscriber station belonging to a multicast group, where each member of the group is assigned the same STID but different ID1s, according to an exemplary embodiment of present invention.

Referring to FIG. 11, in this decoding method, it is assumed that for multiple consecutive assignment A-MAP IEs for the same SS in A-MAP, the entire group of multiple consecutive assignment A-MAP IEs is followed by only one ID1 A-MAP IE.

At step 1105, a Check-for-ID1 A MAP IE is set to false.

Thereafter, at steps 1110 and 1115, the subscriber station analyzes the STID corresponding to the A MAP IE and determines whether an assignment of the A MAP IE corresponds to an assignment thereto based on the STID.

If the subscriber station determines that the assignment A MAP IE does not correspond to an assignment thereto based on the STID at step 1115, the subscriber station proceeds to step 1155 at which the subscriber station determines whether Check-for-ID1 A MAP IE is set to true. If the subscriber station determines that the Check-for-ID1 A MAP IE is set to true at step 1155, then the subscriber station proceeds to step 1160 at which the IEs marked are identified as being for multicast and the subscriber station processes the IEs. The subscriber station further sets the Check-for-ID1 A MAP IE to false. Thereafter, the subscriber station proceeds to step 1140. If the subscriber station determines that the Check-for-ID1 A MAP IE is not set to true at step 1155, then the subscriber station proceeds to step 1140. Step 1140 is described in further detail below.

In contrast, if the subscriber station determines that the assignment A MAP IE corresponds to an assignment thereto based on the STID at step 1115, the subscriber station determines whether the assignment A MAP IE type corresponds to an ID1 A MAP IE at step 1120.

If the subscriber station determines that the assignment A MAP IE type does not correspond to an ID1 A MAP IE at step 1120, then the subscriber station proceeds to step 1165 at which the subscriber station marks the IE for processing and the Check-forID1 A MAP IE is set to true. Thereafter, the subscriber station proceeds to step 1140.

In contrast, if the subscriber station determines that the assignment A MAP IE type corresponds to an ID1 A MAP IE at step 1120, then the subscriber station proceeds to step 1125 at which the subscriber station determines whether the Check-for-ID1 A MAP IE is set to true.

If the subscriber station determines that the Check-for-ID1 A MAP IE is not set to true at step 1125, then the subscriber station proceeds to step 1140.

In contrast, if the subscriber station determines that the Check-for-ID1 A MAP IE is set to true at step 1125, then the subscriber station proceeds to step 1130 at which the subscriber station determines whether the ID1 in the ID1 A MAP IE corresponds to the ID1 associated with the subscriber station.

If the subscriber station determines that the ID1 in the ID1 A MAP IE is not associated with the subscriber station at step 1130, then the subscriber station proceeds to step 1170 at which the subscriber station unmarks the previous marked IE (if any) and sets the Check-for-ID1 A MAP IE to false. Thereafter, the subscriber station proceeds to step 1140.

In contrast, if the subscriber station determines that the ID1 in the ID1 A MAP IE corresponds to the ID1 associated with the subscriber station at step 1130, then the subscriber station proceeds to step 1135 at which the IEs are marked as being only associated with the subscriber station and the IEs are processes. The subscriber station further sets the Check-for-ID1 A MAP IE to false. Thereafter, the subscriber station proceeds to step 1140.

At step 1140, the subscriber station determines whether more MAP IEs remain. If the subscriber station determines that more MAP IEs remain at step 1140, then the subscriber station proceeds to step 1110. In contrast, if the subscriber station determines that no more MAP IEs remain at step 1140, then the subscriber station proceeds to step 1145.

At step 1145, the subscriber station determines whether the Check-for-ID1 A MAP IE is set to true. If the subscriber station determines that the Check-for-ID1 A MAP IE is not set to true at step 1145, then the subscriber station ends the process. In contrast, if the subscriber station determines that the Check-for-ID1 A MAP IE is set to true at step 1145, then the subscriber station proceeds to step 1150.

At step 1150, the subscriber station processes the IEs marked for multicast and sets the Check-for-ID1 A MAP IE to false. Thereafter, the subscriber station ends the process.

Figure 12:
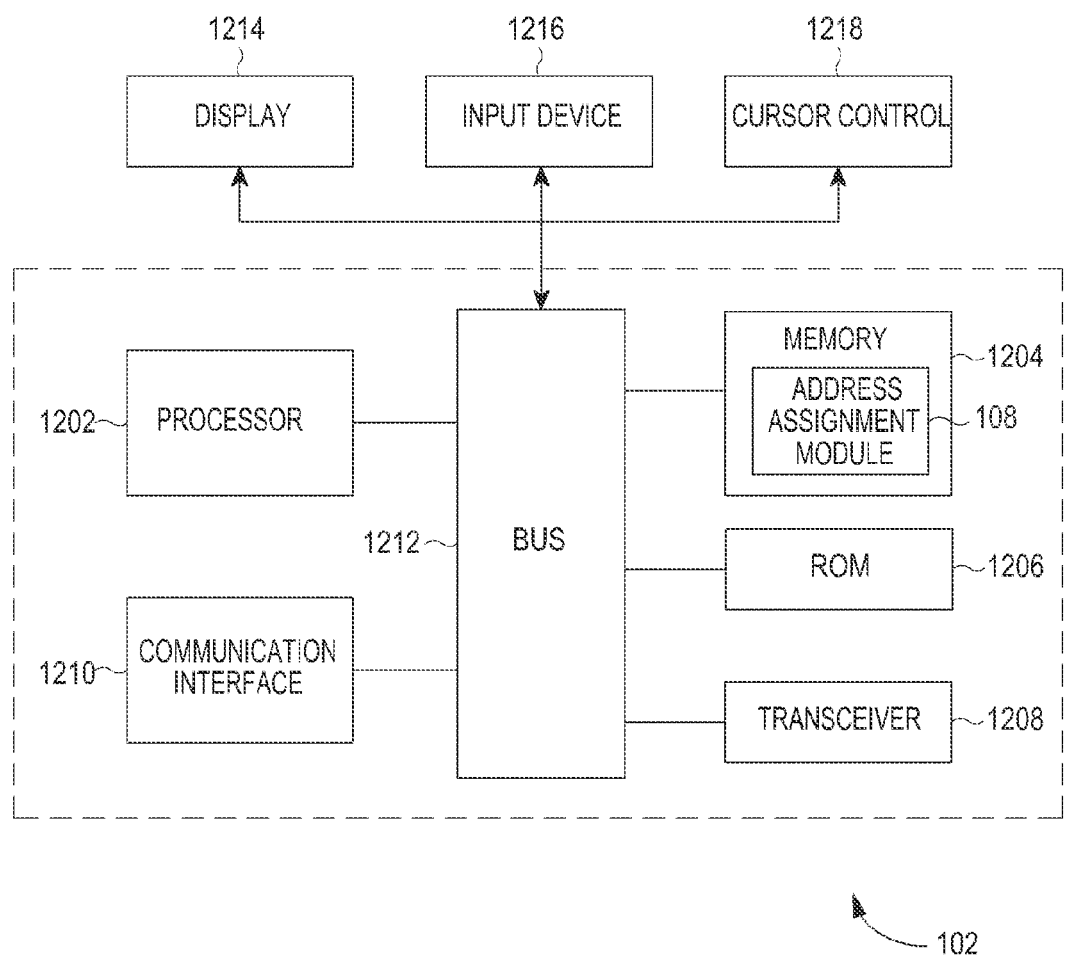
FIG. 12 illustrates a block diagram of a base station showing various components according to an exemplary embodiment of the present invention.

FIG. 12 illustrates a block diagram of a base station showing various components according to an exemplary embodiment of the present invention.

Referring to FIG. 12, the base station 102 includes a processor 1202, a memory 1204, a Read Only Memory (ROM) 1206, a transceiver 1208, a communication interface 1210, a bus 1212, a display 1214, an input device 1216, and a cursor control 1218.

The processor 1202, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1202 may also include embedded controllers, such as generic or programmable logic devices or arrays, application specific integrated circuits, single-chip computers, smart cards, and the like.

The memory 1204 may be volatile memory and non-volatile memory. The memory 1204 includes an address assignment module 108 in the form of instructions stored therein to assign unicast addresses to subscriber stations in a wireless communication environment, according to an exemplary embodiment of the present invention. A variety of non-transitory computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

Exemplary embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 1202. For example, a computer program may include machine-readable instructions capable of assigning addresses to subscriber stations 104A-N in a wireless communication network, according to the teachings and herein described exemplary embodiments of the present invention. According to an exemplary embodiment of the present invention, the computer program may be included on a storage medium and loaded from the storage medium to a hard drive in the non-volatile memory.

The transceiver 1208 is configured for receiving a request to register with a wireless communication network and communicating an unicast address and specific time duration to each subscriber station. The components such as the communication interface 1210, the display 1214, the input device 1216, and the cursor control 1218 are well known to the person skilled in the art and hence the explanation is thereof omitted.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method of assigning addresses to subscriber stations in a wireless communication environment, the method comprising:

assigning a unicast address and a first time duration to a first subscriber station for communicating with a network entity in a wireless communication network;

assigning the unicast address and a second time duration to a second subscriber station for communicating with the network entity in the wireless communication network; and transmitting information associated with the unicast address and the first time duration to the first subscriber station and transmitting information associated with the unicast address and the second time duration to the second subscriber station, wherein the unicast address is valid for the first subscriber station during the first time duration and for the second subscriber station during the second time duration, wherein the first subscriber station is uniquely identified using both the unicast address and the first time duration, wherein the second subscriber station is uniquely identified using both the unicast address and the second time duration, wherein the unicast address is assigned from a first set of station identifiers and a second set of station identifiers, and wherein the second set of station identifiers is formed using the first set of station identifiers and a set of extended bits.

2. The method of claim 1, wherein the assigning of the unicast address and the first time duration to the first subscriber station comprises:
assigning the unicast address and the first time duration to the first subscriber station when the first subscriber station registers with the wireless communication network, and
assigning the unicast address and the second time duration to the second subscriber station when the second subscriber station registers with the wireless communication network.

3. The method of claim 1, wherein the unicast address in conjunction with the first time duration or the second time duration is used by the network entity to distinguish the first subscriber station from the second subscriber station.

4. The method of claim 3, wherein the first time duration or the second time duration is indicative of at least one of a valid period, a valid offset, and a number of consecutive frames assigned to the first subscriber station or the second subscriber station, respectively.

5. The method of claim 4, wherein a first valid period associated with the first subscriber station overlaps a valid period assigned to the second subscriber station.

6. The method of claim 4, wherein a valid period associated with the first subscriber station is different from a valid period assigned to the second subscriber station.

7. The method of claim 1, wherein the first subscriber station and the second subscriber station are non-legacy subscriber stations.

8. The method of claim 1, wherein the first set of station identifiers comprises 12-bit station identifiers and the second set of station identifiers comprises 15-bit station identifiers.

9. The method of claim 1, wherein the set of extended bits comprises elements selected from the group consisting of 0b010, 0b011, 0b100, 0b101, 0b110 and 0b111.

10. The method of claim 1,
wherein the unicast address assigned to the first subscriber station and the second subscriber station from the second set of station identifiers is encoded in a Cyclic Redundancy Check (CRC) mask.

11. The method of claim 1, wherein the unicast address further comprises a unique identifier selected from a set of unique identifiers.

12. The method of claim 11, wherein the unique identifier corresponds to a value in range of 0 to $2^{n-1}$, 'n' being size of the unique identifier.

13. The method of claim 10, further comprising:
transmitting an unique identifier in an assignment message substantially following at least one assignment message carrying the station identifier.

14. A network entity comprising:
a transceiver configured to communicate with subscriber stations; and
a controller configured to:
assign a unicast address and a first time duration to a first subscriber station for communicating with the network entity in a wireless communication network;
assign the unicast address and a second time duration to a second subscriber station for communicating with the network entity in the wireless communication network; and
transmit information associated with the unicast address and the first time duration to the first subscriber station and transmit information associated with the unicast address and the second time duration to the second subscriber station,
wherein the unicast address is valid for the first subscriber station during the first time duration and for the second subscriber station during the second time duration,
wherein the first subscriber station is uniquely identified using both the unicast address and the first time duration,
wherein the second subscriber station is uniquely identified using both the unicast address and the second time duration,
wherein the unicast address is assigned from a first set of station identifiers and a second set of station identifiers, and
wherein the second set of station identifiers is formed using the first set of station identifiers and a set of extended bits.

15. The network entity of claim 14, wherein the controller is further configured to:
assign the unicast address and the first time duration to the first subscriber station when the first subscriber station registers with the wireless communication network, and
assign the unicast address and the second time duration to the second subscriber station when the second subscriber station registers with the wireless communication network.

16. The network entity of claim 14, wherein the unicast address in conjunction with the first time duration or the second time duration is used to distinguish the first subscriber station from the second subscriber station.

17. The network entity of claim 14, wherein the first time duration or the second time duration is indicative of at least one of a valid period, a valid offset, and a number of consecutive frames assigned to the first subscriber station or the second subscriber station, respectively.

18. The network entity of claim 17, wherein a first valid period associated with the first subscriber station overlaps a second valid period assigned to the second subscriber station.

19. The network entity of claim 18, wherein the first valid period associated with the first subscriber station is different from the second valid period assigned to the second subscriber station.

20. The network entity of claim 14, wherein the first subscriber station and the second subscriber station are non-legacy subscriber stations.

21. A system comprising:
a plurality of subscriber stations; and
a network entity configured to:
assign a unicast address and a first time duration to a first subscriber station for communicating with the network entity;
assign the unicast address and a second time duration to a second subscriber station for communicating with the network entity; and
transmit information associated with the unicast address and the first time duration to the first subscriber station and transmit information associated with the unicast address and the second time duration to the second subscriber unit, wherein the unicast address is valid for the first subscriber station during the first time duration and for the second subscriber station during the second time duration, wherein the first subscriber station is uniquely identified using both the unicast address and the first time duration, wherein the second subscriber station is uniquely identified using both the unicast address and the second time duration, wherein the unicast address is assigned from a first set of station identifiers and a second set of station identifiers, and wherein the second set of station identifiers is formed using the first set of station identifiers and a set of extended bits.

22. The system of claim 21, wherein the network node is further configured to:

assign the unicast address and the first time duration to the first subscriber station when the first subscriber station registers with the wireless communication network, and assign the unicast address and the second time duration to the second subscriber station when the second subscriber station registers with the wireless communication network.

23. The system of claim 21, wherein the unicast address in conjunction with the first time duration or the second time duration is used to distinguish the first subscriber station from the second subscriber station.

24. The system of claim 23, wherein the first time duration or the second time duration is indicative of at least one of a valid period, a valid offset, and a number of consecutive frames assigned to the first subscriber station or the second subscriber station, respectively.

25. The system of claim 24, wherein a valid period associated with the first subscriber station overlaps a valid period assigned to the second subscriber station.

26. The system of claim 25, wherein the valid period associated with the first subscriber station is different from the valid period assigned to the second subscriber station.

27. The system of claim 21, wherein the first subscriber station and the second subscriber station are non-legacy subscriber stations.

* * * * *